United States Patent
Dorairaj

(10) Patent No.: US 8,897,586 B2
(45) Date of Patent: Nov. 25, 2014

(54) DYNAMIC GENERATION OF A QUANTIZATION MATRIX FOR COMPRESSION OF A DIGITAL OBJECT

(75) Inventor: Sanjay Dorairaj, Mt. Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 189 days.

(21) Appl. No.: 13/524,767

(22) Filed: Jun. 15, 2012

(65) Prior Publication Data
US 2013/0336594 A1    Dec. 19, 2013

(51) Int. Cl.
*G06K 9/46*    (2006.01)

(52) U.S. Cl.
USPC .......... 382/250; 382/235; 382/243; 382/251; 358/426.13; 358/426.14

(58) Field of Classification Search
USPC ................. 382/235, 243, 244, 250, 251; 358/426.13, 426.14
See application file for complete search history.

(56) References Cited

U.S. PATENT DOCUMENTS

| | | | | |
|---|---|---|---|---|
| 5,459,586 A * | 10/1995 | Nagasato et al. | ............. | 358/450 |
| 5,946,417 A * | 8/1999 | Bonneau et al. | ............. | 382/236 |
| 6,002,794 A * | 12/1999 | Bonneau et al. | ............. | 382/166 |
| 6,522,767 B1 * | 2/2003 | Moskowitz et al. | ......... | 382/100 |
| 7,457,472 B2 * | 11/2008 | Pace et al. | ..................... | 382/236 |
| 7,508,990 B2 * | 3/2009 | Pace | ................. | 382/236 |
| 7,539,599 B2 * | 5/2009 | Hasegawa et al. | ............ | 702/185 |
| 8,281,140 B2 * | 10/2012 | Moskowitz | .................. | 713/176 |
| 8,392,430 B2 * | 3/2013 | Hua et al. | ..................... | 707/748 |
| 8,681,873 B2 * | 3/2014 | Bivolarsky et al. | ...... | 375/240.21 |

\* cited by examiner

*Primary Examiner* — Yosef Kassa
(74) *Attorney, Agent, or Firm* — Ballard Sphar, LLP

(57) ABSTRACT

Some aspects of the disclosure relate to a compression technique that can permit determining dynamically a satisfactory quantization matrix based at least on properties intrinsic to a digital object being compressed and a predetermined compression quality criterion, wherein the quantization matrix is associated with a specific space-domain-to-frequency-domain transforms. In one aspect, the compression technique can permit creation of a compressed digital object that can satisfy a predetermined a compression quality criterion.

20 Claims, 9 Drawing Sheets

```
Sample size, n:      341
Degrees of freedom: 339

Correlation Results:
Correlation coeff, r: -0.3152117
Critical r:           ±0.1062275
P-value (two-tailed): 0.000

Reject the Null Hypothesis
Sample provides evidence to support linear correlation Regression Results:
Y= b0 + b1x:
Y Intercept, b0:     18.8391
Slope, b1:           -0.1645502

Total Variation:     11402.86
Explained Variation: 1132.97
Unexplained Variation: 10269.89
Standard Error:      5.504059
Coeff of Det, R^2:   0.0993584
```

US 8,897,586 B2

DYNAMIC GENERATION OF A QUANTIZATION MATRIX FOR COMPRESSION OF A DIGITAL OBJECT

BACKGROUND

Methodologies for processing digital content (pictures, video, audio, etc.) generally entail application of mathematical formalisms suitable for discrete data objects. Some of those formalisms are devised for compression of a discrete data object (also referred to as a digital object), wherein compression generally refers to generation of a representation of the discrete data object that consumes less memory resources than an original representation of such object. As part of compression of a digital object, quantization of a frequency-domain representation of a data structure representing the digital object is applied. While quantization permits, at least in part, compression of the digital object, such compression generally is lossy. Thus, quality of a restored digital object can be affected by specific configuration of quantization.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

The disclosure relates, in one aspect, to a compression technique that can permit determining dynamically a satisfactory (e.g., optimal) quantization matrix based at least on properties intrinsic to a digital object being compressed and a predetermined compression quality criterion, wherein the quantization matrix is associated with specific space-domain-to-frequency-domain transforms. Thus, in one aspect, the compression technique can permit creation of a compressed digital object that can satisfy a predetermined compression quality criterion. In one implementation, determination of the quantization matrix can be accomplished through evaluation of a functional relationship between a digital variation metric representative of such properties and a parameter indicative of the quantization matrix. Certain embodiments of the disclosure permit generation of the functional relationship based on analysis of compression features of a plurality of digital objects, the features comprising digital variation metrics of original digital objects and correlation metrics between the original objects and respective restored instances of such objects. In another implementation, the quantization matrix can be determined according to a look-up table having the digital variation metric and/or a correlation metric as primary keys, wherein the correlation metrics are indicative of statistical relationship between an original digital object and a restored instance of such object obtained after compression of the original digital object. Various features of the disclosure are illustrated with quantization matrices associated with discrete cosine transforms (DCT), but it should be appreciated that the disclosure can apply to other quantization matrices associated with other space-domain-to-frequency-domain transforms, such as wavelet transforms.

Some embodiments of the disclosure provide various advantages when compared to conventional technologies for compression of digital objects. For example, some embodiments can provide, dynamically, a quantization matrix suitable to achieve a specific compression quality for compression of a digital object.

Additional aspects or advantages of the subject disclosure will be set forth in part in the description which follows, and in part will be obvious from the description, or may be learned by practice of the subject disclosure. The advantages of the subject disclosure will be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The annexed drawings are an integral part of the subject disclosure and illustrate exemplary embodiments thereof. Together with the description set forth herein and the claims appended hereto, the annexed drawings serve to explain various principles, features, or aspects of the disclosure.

DETAILED DESCRIPTION

Figure 1:
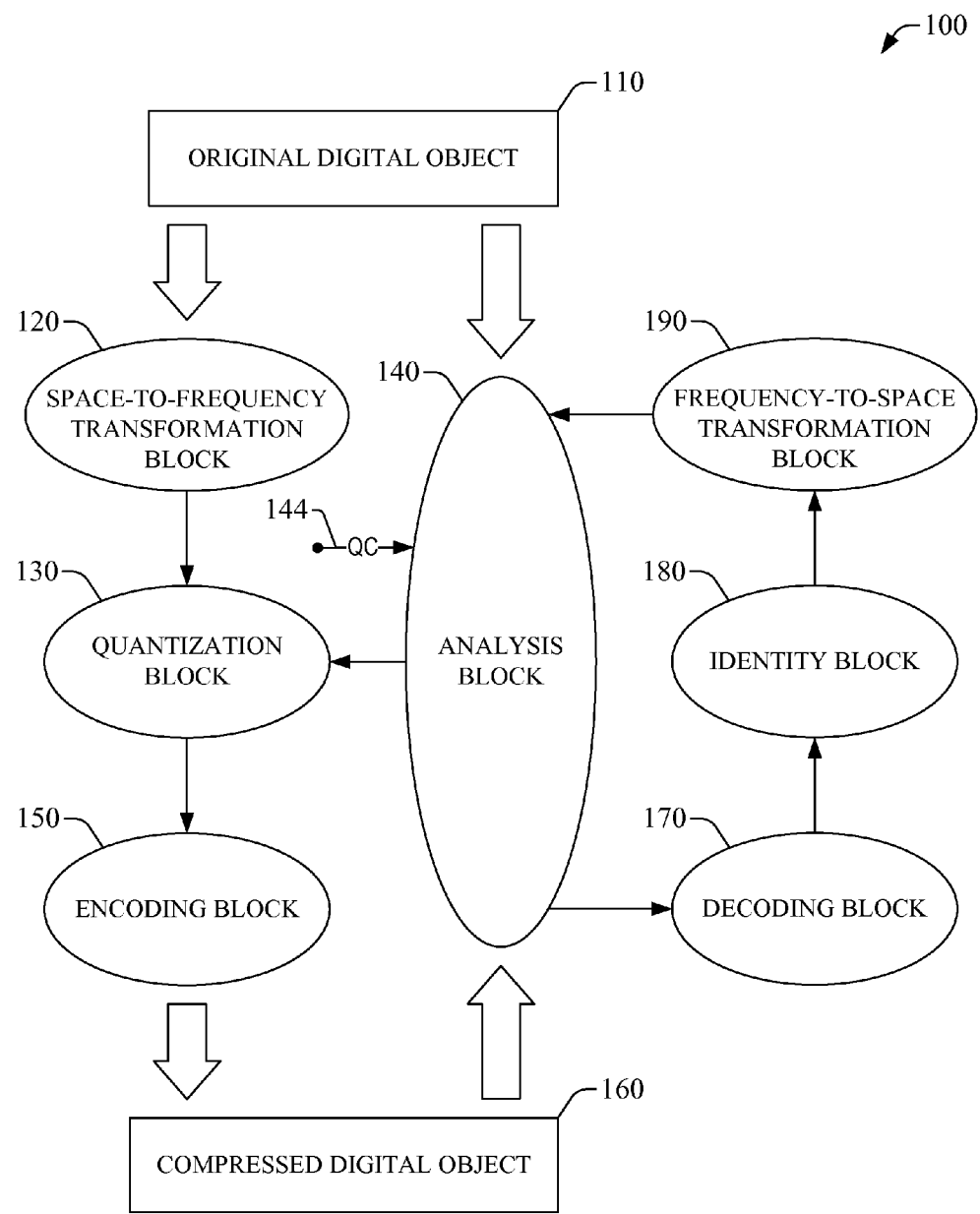
FIG. 1 illustrates an exemplary compression technique in accordance with one or more aspects of the disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the subject disclosure is not limited to specific systems, articles, apparatuses, and methods for dynamic compression of digital content (e.g., non-motion pictures, motion pictures or video segments, audio segments, and the like) in an active replication topology of a distributed content repository. It is also to be understood that the terminology employed herein is for the purpose of describing particular, non-exclusive embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "engine," "component," "unit," "interface," "platform," "node," "function" and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a system, an engine, a node, an interface, a function, a component, a platform, and the like. It is noted that in certain embodiments, or in connection with certain aspects or features of such embodiments, the terms "system," "layer," "unit," "component," "interface," "platform" "node," "function" can be utilized interchangeably.

Throughout the description and claims of this specification, the words "comprise," "include," and "having" and their variations, such as "comprising" and "comprises," "include" and "including," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Disclosed are components that can be utilized to perform the disclosed methods, devices, and/or systems. These and other components are disclosed herein, and it is understood that when combinations, subsets, interactions, groups, etc. of these components are disclosed that while specific reference of each various individual and collective combinations and permutation(s) of these may not be explicitly disclosed, each is specifically contemplated and described herein, for all methods, devices, and/or systems. This applies to all aspects of the subject disclosure including steps, or actions, in the disclosed method(s). Thus, if there are a variety of additional steps, or actions, that can be performed, then it is understood that each of such additional steps, or actions, can be performed with any specific embodiment or combination of embodiments of the disclosed methods.

As it will be readily appreciated, in one aspect, the methods, devices, and/or systems of the disclosure can take the form of an entirely hardware embodiment, an entirely software embodiment, or an embodiment combining software and hardware aspects. In an additional or alternative aspect, the methods, devices, and/or systems can take the form of a computer program product on a computer-readable storage medium having computer-readable program instructions (e.g., computer software) embodied in the storage medium. More particularly, the disclosed methods, devices, and/or systems can take the form of web-implemented computer software. Any suitable computer-readable storage medium can be utilized including hard disks, CD-ROMs, optical storage devices, or magnetic storage devices.

Embodiments of the methods and systems are described below with reference to block diagrams and flowchart and/or call-flow illustrations of methods, systems, apparatuses and computer program products. It will be understood that each block of the block diagrams and flowchart illustrations, and combinations of blocks in the block diagrams and flowchart illustrations, respectively, can be implemented by computer program instructions. Such computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions also can be loaded onto a computer or other programmable data processing apparatus to cause a series of operational steps, or acts, to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that can perform the specified functions or steps, or combinations of special purpose hardware and computer instructions.

Reference will now be made in detail to the various embodiments and related aspects of the subject disclosure, examples of which are illustrated in the accompanying drawings and their previous and following description. Wherever possible, the same reference numbers are used throughout the drawings to refer to the same or like parts.

The disclosure identifies and addresses, in one aspect, the issue of heuristic determination of quantization matrices for image processing, such as compression. One shortcoming of conventional approaches is that quantization matrices are not customized to specific images, thus image quality after restoration of two or more images that have been compressed utilizing a conventional quantization matrix associated with a specific quality index typically is not consistent between such images.

In processing of digital content, Joint Photographic Experts Group (JPEG) image compression and variants thereof can contribute to reduce the size of (or to compress) data structures representing the digital images, thus permitting such data structures, and the related digital content, to be easily stored and transmitted. Accordingly, the JPEG image compression technique is now an integral part of most image and video compression standards, such as Moving Picture Experts Group-2 (MPEG-2) or H.264. In a scenario in which a non-moving picture (or image) is compressed, a direct cosine transform—a lossy compression scheme—can be applied to convert the non-moving image from a representation in spatial domain to frequency domain.

In a quantization stage of compression, frequency components that are most perceptible to the human eye can be retained, whereas other frequency components that are perceived less can be removed from a representation of the digital content. Such elimination is at the core of the JPEG compression technique because a majority of frequency components can be removed, therefore permitting straightforward application of compression techniques on the remaining data and thereby achieve substantive compression rates (e.g., nearly 90% compression rate).

In one aspect, quality of a JPEG compressed image is largely a function of the number of low and high frequency components that can be retained in a data structure that embodies a compressed digital object. It should be appreciated that it generally is desirable to retain lower frequency components because the human eye can be more sensitive to such components and absence thereof can be readily perceived, with the ensuing lowering of perceived quality of a rendering of the compressed digital object. Yet, retention of larger number of frequencies, including high frequencies, in such data structure can permit restoration of the compressed digital object with higher fidelity. Thus, image quality after compression can be a function of the number of higher frequency components that can be retained in an image compression scheme. In one aspect, as described herein, a larger count of higher frequency components generally yields greater quality. Certain conventional JPEG image compression techniques can permit a user device to specify a quality index for a compressed digital object (e.g., a data structure representative of a compressed image), wherein the quality index can range from 1 to 100, with higher indices being representative of higher quality. In one aspect, the quality index can be mapped to a corresponding DCT quantization matrix, which can determine, at least in part, a set of one or more candidate frequency components to include in the compressed digital object. Such a mapping from quality index to DCT quantization matrix can be obtained, for example, from experiments on the human visual system. As described herein, a shortcoming of such compression approach is that for a specific quality index (or quality level), the actual quality of the compressed image is not uniform across multiple images. For example, a compression scheme implemented with a quality index of 90 on two different original digital images can generate respective compressed digital images yielding different degrees of correlation between respective restored digital images and the respective original digital images. It should be appreciated that the term "correlation" as utilized in the subject disclosure refers to a measure of correlation among two sets of static data rather than to autocorrelation or cross-correlation among time-dependent signals as commonly applied in digital signal processing.

As an illustration, a conventional method for determining a discrete cosine transform (DCT) quantization matrix for a specific quality index typically is nearly exclusively based on subjective experimentation involving the human visual system. Such quality indices generally range from 1 to 100, with 1 being representative of low quality. As an example, Eq. (1) illustrates a conventional quantization matrix $Q_0$ for 8×8 macroblocks (commonly referred to as Minimum Coded Unit) and associated with a quality index of 50 (such index referred to as Q50):

$$\vec{Q}_0 = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix} \quad \text{Eq. (1)}$$

Quantization matrices for 8×8 macroblocks and a quality index q greater than 50 can be derived by multiplying $Q_0$ by $\eta = (100-q)/50$. Quantization matrices for a quality index q' lower than 50 can be derived by multiplying $Q_0$ by $(50/q')$. It can be appreciated that, conventionally, changes to a quantization are not directly related to specific feature(s) of a digital object to be compressed.

In addition to quantization, compression techniques can comprise one or more types of encoding, e.g., entropy encoding, run-length-encoding, Huffman encoding, or the like. Encoding can further the compression accomplished via quantization.

As described in greater detail below, the disclosure relates, in one aspect, to a compression technique (system(s), method(s), system(s) and method(s), etc.) that can permit determining dynamically a satisfactory (e.g., optimal or nearly-optimal) quantization matrix associated with a space-domain-to-frequency-domain transform (e.g., DCT, wavelet transform, or the like) based at least on properties intrinsic to an image being compressed. The approach can permit creation of a compressed image that satisfies or guarantees a predetermined (e.g., required) degree of correlation with an original image prior to compression. Accordingly, the disclosed compression technique can depart from definitions of image quality that rely on subjective metrics (e.g., subjective quality indices that map into DCT quantization matrices), and can permit defining image quality objectively, according to a restored image—obtained from decompression of the compressed image, for example—and correlation thereof with the original image. For a predetermined degree of correlation between an original digital object and a restored image associated therewith, in one aspect, the compression technique can utilize the variation between values of pixels within the original image to determine dynamically a quantization matrix associated with a space-domain-to-frequency-domain transform, wherein the quantization matrix can permit compression of a digital object with a predetermined quality. In certain implementations, for example, to determine a DCT quantization matrix (a quantization matrix associated with a DCT transform) for such predetermined degree of correlation, a digital variation metric of a digital object can be assessed via a standard deviation ($\sigma$) of pixel values contained in a data structure representative of the digital object. In other implementations, for example, a digital variation metric of the digital object can be assessed, for example, via a skewness of pixel values contained in the data structure representative of the digital object. In one aspect, a specific standard deviation value can be utilized as an argument in a mathematical relationship that can determine a specific DTC quantization matrix. In certain embodiments, for example, such mathematical relationship can be a linear relationship that can be established through numerical experimentation comprising detailed analysis of a plurality of digital objects, such as a set of 730 24-bit RGB images, with standard deviation values ranging from about 25 to about 100.

In another aspect, certain embodiments can reveal, for example, a linear relationship between image variation and DCT quantization matrices for a specific desired level of correlation among an original digital object and a restored digital object associated therewith. In one exemplary implementation, analysis of a standard set of 31 DCT quantization matrices and 730 24-bit bitmap images with variations ranging from 25 to 100 can illustrate such linear relationship.

Figure 2:
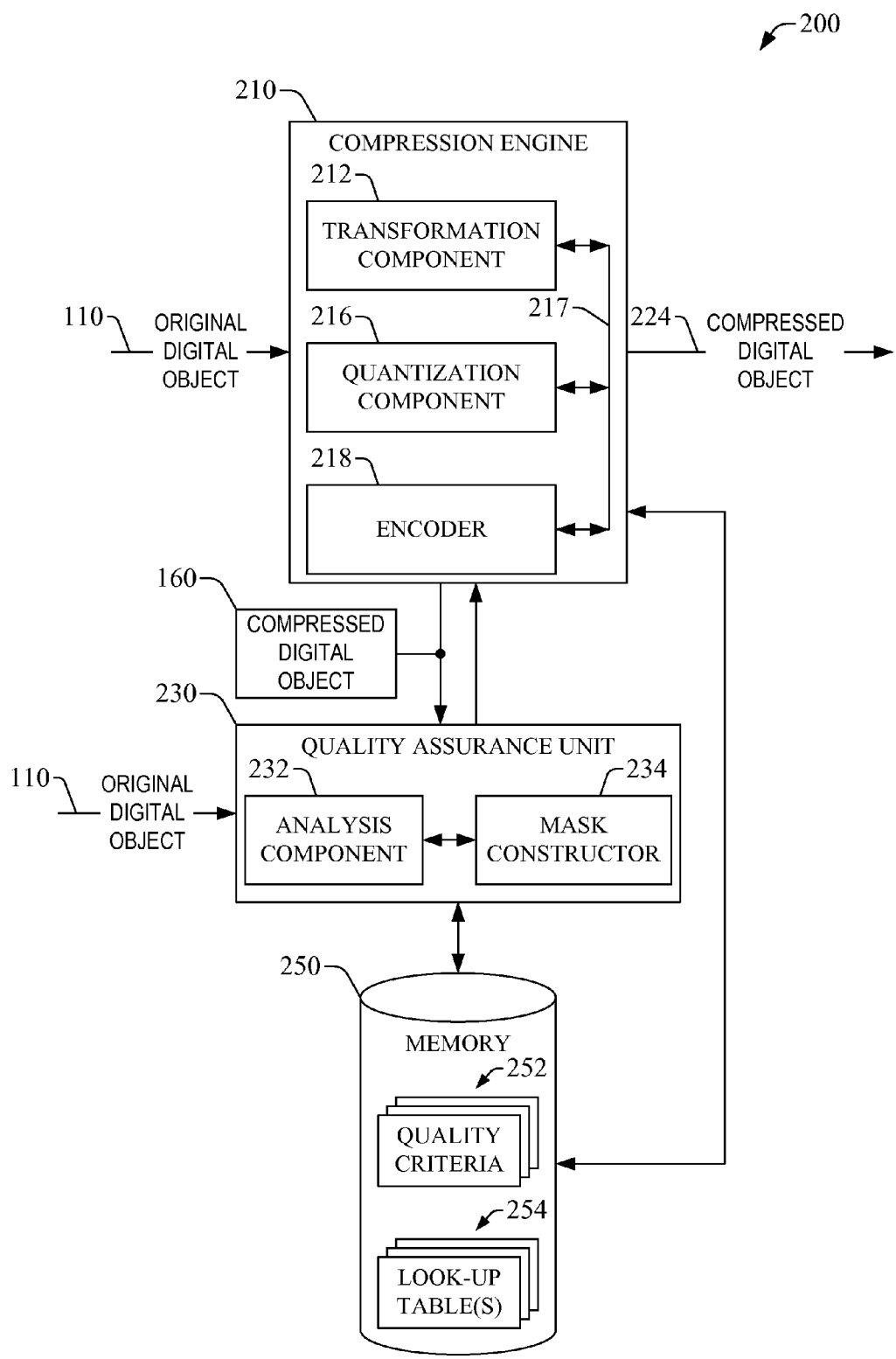
FIG. 2 illustrates an exemplary system for compression of a digital object in accordance with one or more aspects of the disclosure.

FIG. 1 illustrates a block diagram of an exemplary compression technique 100 in accordance with one or more aspects of the disclosure. Various implementation features of the exemplary technique 100 can be achieved with the exemplary system 200, shown in FIG. 2, for compression of a digital object. As illustrated, the compression technique 100 operates on an original digital object 110 and comprises four stages represented by functional blocks 120-150. Original digital object 110 can be embodied in a data structure representative of a digital asset, or digital object, such as an image, a video segment, an audio segment, and so forth. In certain embodiments, the original digital object 110 can be a non-moving bitmap image having $N_x \times N_y$ pixels aligned in $M \times M$ macroblocks, each pixel having a D-bit of color depth, where $N_x$, $N_y$, M, and D are natural numbers. For example, in one embodiment, $N_x=320$, $N_y=240$, M=16, and D=24.

The original digital object 110 (e.g., an image) can be received at block 120 in which a space-domain-to-frequency-domain transform (e.g., a discrete cosine transform) can be applied to such object. As a result, the original digital object 110 can be transformed from a representation in space domain to a representation in frequency domain, thus generating a transformed instance of the original digital object 110 that can be conveyed to block 130. Accordingly, block 120 is referred to as space-to-frequency transformation 120. In one implementation in which the original digital object 110 comprises a plurality of $M \times M$ macroblocks, application of a discrete cosine transform to each one of the plurality of $M \times M$ macroblocks can be transformed into a plurality of DCT coefficients. As an example, in embodiment 200, a compression engine 210 can receive the original digital object 110, and a transformation component 212 can transform data in each macroblock of $M \times M$ macroblocks of the original digital object 110 into a plurality of coefficients according to the space-domain-to-frequency-domain transform. In one implementation, such coefficients can be real numbers.

As illustrated, the transformed instance of the original digital object 110 can be quantized at block 130 (referred to as quantization block 130). To at least such end, in one aspect, a plurality of coefficients (e.g., DCT coefficients) representing a macroblock of a transformed instance of the original digital object 110 can be arithmetically ANDed with a quantization matrix. Quantization can result in removal of certain high-frequency component(s) from a digital representation of the transformed instance of the original digital object 110, and retention of other frequency component(s) from such representation. As described herein, the one or more frequencies that can be retained can be frequencies that are most perceptible to the human visual system. In an implementation in which the space-domain-to-frequency-domain transform is a two-dimensional (2D) direct cosine transform (DCT), each quantization matrix utilized at block 130 can be referred to as a DCT quantization matrix and, in one aspect, each DCT quantization matrix be a 16×16 matrix. The number of non-zero matrix elements in a DCT quantization matrix represents a number of frequency components retained in such matrix. As an example, in embodiment 200, a quantization component 216 can perform an arithmetic AND operation between a set of $M \times M$ coefficients according to the space-domain-to-frequency-domain transform and an $M \times M$ quantization matrix. In one implementation in which the original digital object 110 is a digital image having $N_x \times N_y$ pixels aligned in $M \times M$ macroblocks, the quantization component 216 can perform $(N_x \times N_y)/(M \times M)$ arithmetic AND operations between respective sets of $M \times M$ coefficients according to the space-domain-to-frequency-domain transform and a single $M \times M$ quantization matrix.

The original digital object 110 also can be received at block 140 (referred to as analysis block 140) for analysis. In one aspect, such object can be analyzed prior to implementation of quantization block 130 and, as an outcome of the analysis, a specific quantization matrix associated with a space-to-frequency transformation can be selected for quantization, at block 130, of the transformed instance of the original digital object 110. In certain implementations, the specific quantization matrix can be conveyed to the quantization block 130 to be utilized in quantization of the transformed instance of the original digital object 110. As an example, in embodiment 200, a quality assurance unit 230 can include an analysis component 232 that performs the analysis of a data structure indicative of the original digital object 110. The quality assurance unit 230 also can comprise a mask constructor component 234, functionally coupled to the analysis component 232, that can supply (e.g., acquire, acquire and transmit, generate, generated and transmit, update, update and transmit, or the like) a quantization matrix in response to an outcome of the analysis performed by the analysis component 232.

At block 150, a quantized representation of a transformed instance of the original digital object 110 can be encoded in order to increase compression efficiency. One or more types of encoding, such as entropy encoding, run-length encoding, Huffman encoding, or the like, can be implemented in the exemplary compression technique 100. Block 150 is referred to as encoding block 150. Output of encoding block 150 is a compressed digital object 160 (a non-motion picture), which can be embodied in another data structure representative of the digital asset associated with the original digital object. As an example, in embodiment 200, the compression engine 210 can comprise an encoder component 218 (also referred to as encoder 218) that can encode the transformed instance of the original digital object 110. The transformation component 212, the quantization component 216, and encoder 218 can be functionally coupled, and exchange information (e.g., computer-executable instructions, data, metadata, and/or signaling), via a bus 217.

In the exemplary compression technique 100, the compressed digital object 160 can be conveyed to analysis block 140 for analysis. In one implementation, for example, the compressed digital object 160 can be analyzed to determine fidelity of the compressed digital object 160 with respect to the original digital object 110 image yielding the compressed image in response to compression. Fidelity of the compressed image can be indicative of image quality. In one aspect, determining such fidelity can comprise determining if compression quality satisfies a predetermined quality criterion. In one aspect, the compression quality of the compressed digital object 160 can be determined by the degree of correlation between the original digital object 110 and a restored digital object obtained from decompressing the compressed digital object 160. The degree of correlation is a measure of the statistical relationship among a first group {X} of pixel values representative of the original digital object 110 and a second group {Y} of pixel values representative of the restored digital object. In certain implementations, the degree of correlation is determined by the Pearson product-moment correlation coefficient (or Person's r). For example, such correlation coefficient (ρ) can be computed as the ratio between the covariance of {X} and {Y} (cov(X,Y)) and the product of the standard deviations $\sigma_x$ and $\sigma_y$ of {X} and {Y}:

$$\rho = \frac{\text{cov}(X, Y)}{\sigma_X \sigma_Y}.$$

It should be appreciated that other metrics suitable to establish the degree of correlation, such as Person's $\chi^2$ test, also are contemplated in the disclosure. In general, a higher correlation coefficient can convey that a restored instance of the original digital object 110 can have higher fidelity with respect to the original digital object 110. In one implementation of the disclosed approach, an end-user device can specify a quality criterion (QC) 144 that can establish an extent to which an end-user associated with the end-user device can require the compressed image to correlate with the original image, e.g., to specify the correlation coefficient. As an example, in embodiment 200, the analysis component 232 can determine the degree of correlation between the original object 110 and the restored digital object obtained from decompressing the compressed digital object 160, which can be received at the quality assurance unit 230 from the compression engine 210. Analysis component 232 can access a set of one or more quality criteria 252 to compare such degree of correlation with at least one of the one or more quality criteria 252.

To determine the compression quality of the compressed digital object 160, in one aspect, the analysis block 140 can perform decompression. To at least such end, in the exemplary compression technique 100, the analysis block 140 can implement (e.g., perform or cause to perform) three blocks: (1) Decoding block 170, in which the compressed digital object 160 is decoded in accordance with the inverse process of the encoding process implemented at encoding block 150. For example, in a scenario in which the encoding process is Huffman encoding, the inverse process is Huffman decoding. A restored quantized digital object is generated as a result of decoding at block 170; (2) identity block 180, in which the restored quantized digital object is retained, e.g., the identity operator is applied to such object; and (3) frequency-to-space transformation block 190, in which the restored quantized digital object is transformed into a space representation through application of the frequency-domain-to-spatial-domain transform that is the inverse transform of that utilized at block 120. As a result, a restored instance of the original digital object 110 can be generated. As an example, in embodiment 200, the analysis component 232 can configure compression engine 210, and components therein, to implement the foregoing blocks (1) through (3) and, as a result, generate the restored instance of the original digital object 110. To configure the compression engine in such a manner of operation, the analysis component 232 can transmit signaling to the compression engine 210 that configures the encoder 218 to operate as a decoder, the quantization component 216 to operate as an identity operator, and the transformation component 212 to perform frequency-domain-to-space-domain transform that is the inverse of the transform applied to the original digital object 110.

In one scenario in which the space-domain-to-frequency-domain transform is a DCT, the inverse DCT can be applied to a plurality of DCT coefficients associated with the restored quantized digital object to create 3D RGB matrices indicative of the restored instance of the original digital object 110. Analysis block 140 can generate a quality metric, such as a covariance between values of pixels indicative of the original digital object 110 and values of pixels indicative of the restored instance of the original digital object 110. As an illustration, in embodiment 200, the analysis component 232 can generate the quality metric.

Based on an outcome of the analysis, in one aspect, the compressed digital object 160 can be assessed as satisfactory and, therefore, compression can terminate. For example, a quality metric determined (e.g., calculated) for a restored instance of the original digital object 110 obtained from the compressed digital object 160 can fulfill a quality criterion (e.g., a specific one of the one or more quality criteria 252), such as a specific threshold for quality metrics, thus leading to termination of a compression cycle (e.g., compression and analysis). In such scenario, in embodiment 200, a compressed digital object 224 can be supplied by the compression engine 210. The compressed digital object 224 can be the compressed digital object 160. In another aspect, a different outcome of the analysis can indicate that compression is to be re-effected with an alternative quantization matrix having, for example, a larger number of non-zero matrix elements. Collectively, such matrix elements can determine a number of high-frequency components retained in the described compression technique. In one scenario, in embodiment 200, the analysis component 232 can signal the compression engine 210 that the original digital object 110 is to be compressed with the alternative quantization matrix, and can signal the mask constructor 234 to supply the alternative quantization matrix. In another scenario, in embodiment 200, the analysis component 232 can signal the compression engine 210 that the original digital object 110 is to be compressed with the alternative quantization matrix, and can select the alternative quantization matrix from a set of one or more quantization matrices retained in memory 250. For another example, another quality metric associated with the compressed digital object 160 may not fulfill the quality criterion. In such scenario, the alternative quantization matrix can be determined (e.g., selected) at the analysis block 140. In addition, the transformed instance of the original digital object 110 can be quantized at block 140 in accordance with the alternative quantization matrix, and the resulting alternative quantized representation of the transformed instance of the original digital object 110 can be encoded at the encoding block 150. An alternative compressed digital object can embody the compressed digital object 160, which can be conveyed to the analysis block 140 for further analysis.

It should be appreciated that the exemplary compression technique 100 can determine dynamically a quantization matrix based on an intended compression quality, which can be determined, for example, by a quality criterion. As illustrated, memory 250 can comprise one or more memory elements (quality criteria 252) having one or more predetermined (or preconfigured) quality criteria. It should further be appreciated that the analysis performed in the exemplary technique 100 can be utilized to generate information associated with quantization matrices that can be suitable to achieve a predetermined compression quality, as indicated by a predetermined correlation coefficient $\chi$ between a restored instance of an original digital object, for a specific digital variation metric $\Sigma$ of the original digital object.

A quantization matrix that produces, as part of implementation of a compression technique (e.g., exemplary compression technique 100) of the disclosure, a compressed digital object having the predetermined compression quality can be deemed to be an optimal or nearly optimal quantization matrix. In the alternative, a quantization matrix that does not produce, indirectly, via implementation of a quantization block, a compressed digital object having the predetermined compression quality can be deemed sub-optimal. In certain implementations, the digital variation metric can be represented by the standard deviation between a plurality of digitized values (e.g., pixel values) associated with the original digital object 110. Based on such information, a mapping between a pair ($\chi$, $\Sigma$) and a specific quantization matrix $\tilde{Q}$ can be generated. In one aspect, generation of such mapping for a specific value of c can comprise determining, e.g., calculating via regression, a functional relationship among a quantization matrix and a digital variation metric. In another aspect, for a specific value of $\chi$, the mapping (or the functional relationship) can be represented as a lookup table relating values of $\Sigma$ with quantization matrices $\tilde{Q}$. In one aspect, the lookup table can have the image variation metric and the specific value $\chi$ as primary key.

As an example, quality assurance unit 230 can generate the information associated with quantization matrices that can be suitable to achieve a predetermined compression quality. To at least such end, in one aspect, the quality assurance unit 230 can receive a plurality of original digital objects having a wide range of digital variation metrics, and can configure compression engine 210 to compress each one of the plurality of original digital objects for each one a plurality of quantization matrices. In one aspect, mask constructor 234 can generate the plurality of quantization matrices. Such compression can yield a plurality of compressed digital objects. In addition, the quality assurance unit 230 can configure the compression engine 210 to restore (or decompress) each one of the plurality of compressed digital objects. In one aspect, analysis component 232 can determine the fidelity of each of the restored digital objects and, for a specific correlation coefficient $\chi$, generate a set of one or more 2-tuples, each 2-tuple comprising a digital variation metric for an original object and a parameter representative of the number of frequency components retained in the quantization stage that yielded, during compression of the original digital object, a compressed digital object having a compression quality determined substantially by the specific correlation coefficient $\chi$. In one implementation, analysis component 232 can perform regression (linear or non-linear) to the set of one or more 2-tuples to extract a functional relationship among the digital variation metric and the parameter representative of the number of frequency components retained in the quantization stage. Such functional relationship can embody or comprise the mapping for a pair ($\chi$, $\Sigma$), and a specific quantization matrix $\tilde{Q}$ can be generated.

Figure 3:
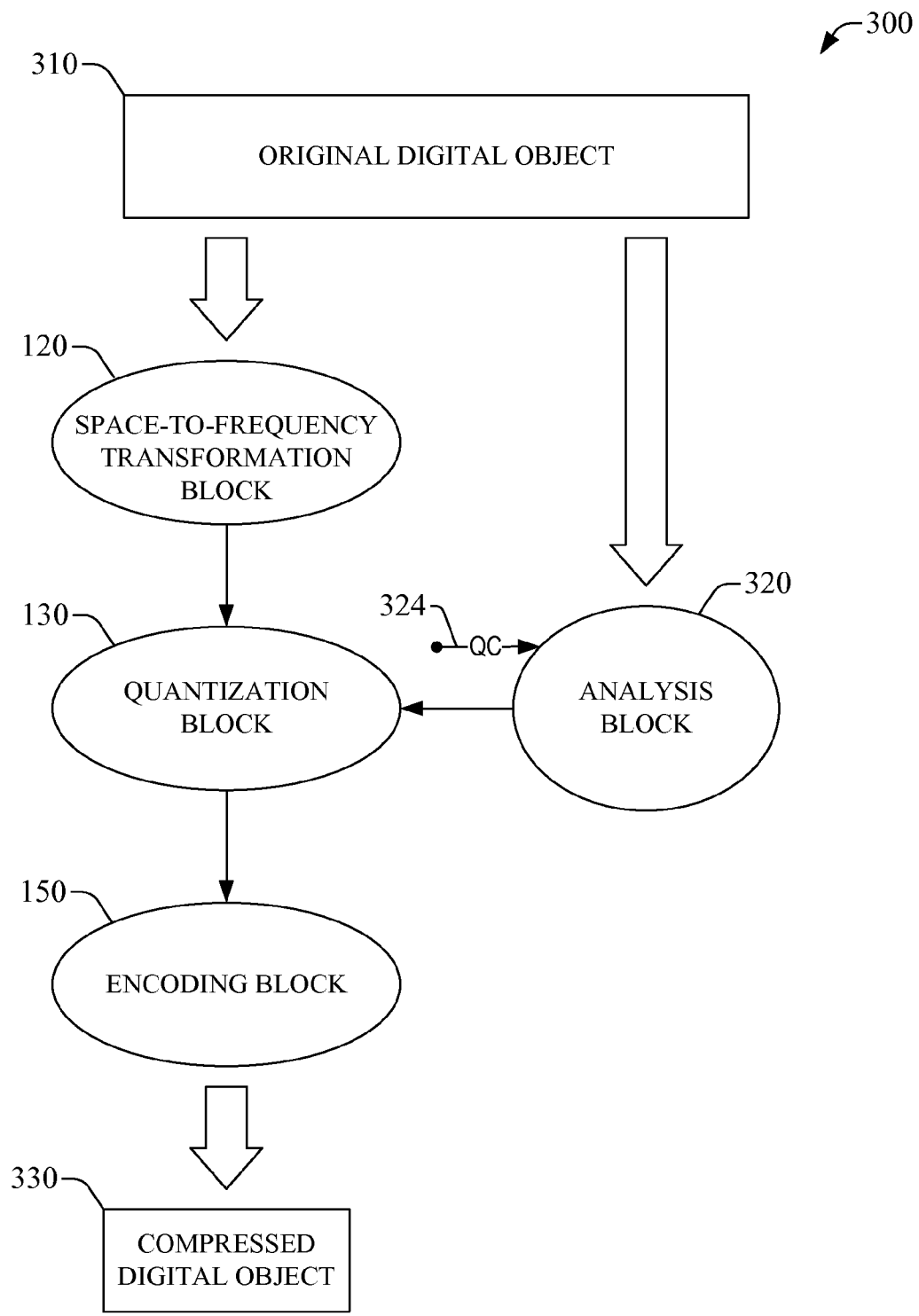
FIG. 3 illustrates an exemplary compression technique in accordance with one or more aspects of the disclosure.

Generation of such mapping, in one aspect, can permit simplifying the exemplary compression technique 100 by removing the iterative features of the compression of an original digital object (e.g., an image) that are associated with attaining a predetermined compression quality. FIG. 3 illustrates a block diagram of an exemplary compression technique 300 representative of a simplified version of the exemplary compression technique 100 in accordance with one or more aspects described herein. Various implementation features of the exemplary technique 300 are illustrated with the exemplary system 200 for compression of a digital object.

In the exemplary compression technique 300, an original digital object 310 can be transformed from a space-domain representation to a frequency-domain representation at block 120, as described herein. As an example, in embodiment 200, transformation component 212 can generate a plurality of coefficients or other data indicative of a frequency-domain representation of the original digital object 310. Prior to implementation of quantization block 130, the original digital object 310 can be analyzed at analysis block 320 to determine, for example, a digital variation metric $\Sigma$ of such object. As described herein, analysis component 232 can perform such analysis. In one aspect, the digital variation metric in conjunction with a correlation coefficient $\chi$ can determine a specific lookup table for a quantization matrix for implementation of quantization block 130. The correlation coefficient $\chi$ can be supplied, in certain scenarios, within a quality criterion (QC) 324 that can be provided to the analysis block 320. In other scenarios, one or more predetermined quality criteria (e.g., one or several of the one or more quality criteria 252) and associated correlation coefficient(s) can be retained in the analysis block 320. As an example, in embodiment 200, such correlation coefficient(s) can be retained in memory 250 as part of quality criteria 252. Based at least on the correlation coefficient $\chi$ and associated lookup table, a specific quantization matrix $\tilde{Q}_{\Sigma;\chi}$ can be selected at the analysis block 320 for quantization of the frequency-domain representation of the original digital object 310. In one scenario, for example, mask constructor 234 can select the a specific quantization matrix $\tilde{Q}_{\Sigma;\chi}$. In another scenario, for another example, analysis component 232 can select such quantization matrix. Memory 250 can comprise one or more memory elements having at least one look-up table, the one or more memory elements are referred to as look-up table(s) 254.

A quantized instance of the frequency-domain representation of the original digital object 310 can be encoded at encoding block 150 and a compressed digital object 330 can be supplied (e.g., generated, or generated and transmitted). It can be appreciated that compressed digital object 330 can have a compression quality associated with the correlation coefficient $\chi$ in view of the selection of the specific $\tilde{Q}_{\Sigma;\chi}$. As an illustration, encoder 218 can encode the quantized instance of the frequency-domain representation of the original digital object 310 (represented as compressed digital object 110 in FIG. 2.), and can output the compressed digital object 330 (represented as compressed digital object 224 in FIG. 2.)

In the exemplary compression technique 300, selection of a dynamic quantization matrix can be dynamic, in response to a digital variation metric of an original digital object to be compressed and/or to an intended compression quality represented by a quality criterion. In one aspect, implementation cost (e.g., computational demand) for the exemplary compression technique 300 can be lower than such cost for the exemplary compression technique 100.

As described herein, the exemplary system 200 for compression of a digital object can operate in analysis mode, permitting generation of information associated with relationships among quantization matrices and digital variation metrics, each of the relationship being specific to a compression quality metric. Various aspects of operation in analysis mode and related analysis are described in greater detail below.

To perform the foregoing analysis across a range of digital variation metrics, a set of N digital objects (e.g., images) can be accessed (e.g., generated, received, selected, or the like). In embodiment 200, analysis component 232 can receive such set of objects. In one aspect, the resolution of each digital object in such set can be normalized to 320×240 pixels. While such normalization is not required, normalizing the resolution of a digital object (or digital asset) can permit, at least in part, aligning individual pixel blocks to macroblocks utilized to represent the digital object. In scenarios in which resolution normalization of a digital object does not yield alignment of blocks with macroblocks, padding (addition of null data) can be applied to a data structure representing the digital object in order to improve or attain alignment. In another aspect, the normalized digital images can be converted into 24-bit 320×240 red-green-blue (RGB) bitmap images, and each image can be arranged in 16×16 macroblock-aligned 3-dimensional RGB matrices. It should be appreciated that other pixel resolutions, macroblock sizes, and/or bit size of color depth (or value of D) can be utilized in the analysis. In one embodiment, for example, N can be equal to 730.

As described herein, in a compression technique, effectiveness of quantization (DCT quantization or otherwise) can depend, at least in part, on a number of frequency components retained in a quantization matrix (e.g., a DCT quantization matrix). In one embodiment, a set of T DCT quantization matrices can be utilized for the analysis performed at analysis block 140. Here, T is a natural number which, in certain embodiments, for example, can be equal to 31. In embodiment 200, mask constructor 234 can generate the set of T DCT quantization matrices. As described herein, each DCT quantization matrix, in one aspect, can be a 16×16 matrix that can be indexed with an numeric index I ranging from 1 through T (e.g., 31), each index representing a number of frequency components retained in the a DCT quantization matrix associated with such index, with larger indices representing a larger number of frequency components. As an illustration, for I=1, the DCT quantization matrix comprises one low frequency component (e.g., the DC component); for I=2, the DCT quantization component can comprise three frequency components; for I=3, the associated DCT quantization matrix can comprise six frequency components; and so forth. In one aspect, the T DCT quantization matrices utilized to perform the analysis described herein can be representative of DCT quantization matrices conventionally utilized for JPEG image compression. The 16×16 DCT quantization matrices in the set of T (e.g., 31) DCT quantization matrices can be utilized to mask directly any high-frequency components in a DCT-transformed macroblock associated with a digital object (e.g., original digital object 110). In embodiment 200, analysis component 232 can perform an arithmetic AND operation among a DCT-transformed macroblock associated with a digital object and a DCT quantization matrix. It should be appreciated that directly masking high-frequency components in a DCT-transformed macroblock permits a consistent approach to analyzing a relationship between digital variation metrics and DCT quantization matrices. As an example, Eq. (2) presents an exemplary quantization matrix for a 16×16 macroblock within a data structure representing a digital object.

$$\vec{Q} = \begin{bmatrix} 1 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \end{bmatrix} \quad \text{Eq. (2)}$$

Another exemplary quantization mask matrix suitable for a 16×16 macroblock within the data structure representing the digital object can be the following:

$$\vec{Q'} = \begin{bmatrix} 1 & 1 & 0 & 0 & 0 & 0 & 0 & 0 & 0 & 0 & 0 & 0 & 0 & 0 & 0 & 0 \\ 1 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \end{bmatrix} \quad \text{Eq. (3)}$$

Yet another exemplary quantization mask matrix suitable for a 16×16 macroblock within the data structure representing the digital object can be the following:

$$\overleftrightarrow{Q''} = \begin{bmatrix} 1 & 1 & 1 & 0 & 0 & 0 & 0 & 0 & 0 & 0 & 0 & 0 & 0 & 0 & 0 & 0 \\ 1 & 1 & 0 & 0 & 0 & 0 & 0 & 0 & 0 & 0 & 0 & 0 & 0 & 0 & 0 & 0 \\ 1 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \end{bmatrix} \quad \text{Eq. (4)}$$

Still another exemplary quantization mask matrix suitable for a 16×16 macroblock within the data structure representing the digital object can be the following:

$$\overleftrightarrow{Q'''} = \begin{bmatrix} 1 & 1 & 1 & 1 & 0 & 0 & 0 & 0 & 0 & 0 & 0 & 0 & 0 & 0 & 0 & 0 \\ 1 & 1 & 1 & 0 & 0 & 0 & 0 & 0 & 0 & 0 & 0 & 0 & 0 & 0 & 0 & 0 \\ 1 & 1 & 0 & 0 & 0 & 0 & 0 & 0 & 0 & 0 & 0 & 0 & 0 & 0 & 0 & 0 \\ 1 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 & 0 & 0 \end{bmatrix} \quad \text{Eq. (5)}$$

Application of a discrete cosine transform to each 16×16 macroblock within an original digital object (e.g., an original image (also referred to as raw image)) can be transformed into a plurality of DCT coefficients. In embodiment 200, transformation component 212 can perform the DCT transformation. As described herein, the resulting macroblock containing the plurality of DCT coefficients can be arithmetically ANDed with each DCT quantization matrix of a set of $N_Q$ DCT quantization matrices (e.g., the set of 31 DCT quantization matrices described herein) to yield, respectively, $N_Q$ sets (e.g., 31 sets) of DCT coefficients associated with the macroblock. Here, $N_Q$ is a natural number equal to or greater than 1. Such procedure can yield $N_Q$ (e.g., $N_Q=31$) different quantized digital objects (e.g., quantized images); one quantized digital object for each instance of a DCT quantization matrix.

In one aspect, the original digital object (e.g., original image) can be restored by applying the inverse DCT to a quantized digital object (e.g., a quantized image) of the $N_Q$ quantized digital objects. In embodiment 200, as described herein, analysis component 232 can be configured to perform a frequency-domain-to-space-domain transform that is the inverse of the space-domain-to-frequency-domain applied to an original digital object. As described herein, in one aspect, the inverse DCT can be applied to a plurality of DCT coefficients associated with the quantized digital object to create 3D RGB matrices indicative of a restored digital object representative of the original digital object. In one implementation, the inverse DCT can be applied to each one of the $N_Q$ quantized digital objects; thus, the original digital object can be associated with a set of $N_Q$ restored digital objects, each restored digital object being associated with a specific DCT quantization matrix, which can be represented by a specific numeric index. As an example, when N=730 and $N_Q$=31, a set of 730×31=22661 restored digital objects can be generated.

A correlation coefficient between data indicative of content of an original digital object and data indicative of content of a restored digital object can be calculated, the restored digital object being obtained from the original digital object after compression. In embodiment 200, as described herein, analysis component 232 can determine such correlation coefficient. In one implementation, such correlation coefficient can be calculated for each one of a plurality of restored digital objects generated with a specific DCT quantization matrix utilized in a scheme for compression of a plurality of original digital objects, each restored digital object of such plurality being respectively associated with an original digital object of the plurality of original digital objects. In one aspect, the correlation coefficient increases with the number of frequency components present in the DCT quantization matrix. As an illustration, Table I presents exemplary results of a calculation of correlation coefficients between restored digital objects and associated original digital objects as obtained for a compression scheme that includes quantization matrices retaining an increasing number of frequency components. In Table I, the number of frequency components is indicated with an numeric index, referred to as DCT quantization matrix index. The exemplary results exhibit a linear relationship between the correlation coefficient and the DCT quantization mask index.

TABLE I

Relationship between correlation coefficient and quantization matrix order for a specific standard deviation.

| Standard Deviation | DCT Quantization Matrix Index | Correlation Coefficient |
|---|---|---|
| 26.296 | 1 | 55.250 |
| 26.296 | 2 | 61.578 |
| 26.296 | 3 | 64.634 |
| 26.296 | 4 | 66.404 |
| 26.296 | 5 | 68.089 |
| 26.296 | 6 | 69.472 |
| 26.296 | 7 | 71.865 |
| 26.296 | 8 | 73.614 |
| 26.296 | 9 | 75.677 |
| 26.296 | 10 | 77.835 |
| 26.296 | 11 | 79.424 |
| 26.296 | 12 | 80.886 |
| 26.296 | 13 | 82.231 |
| 26.296 | 14 | 83.219 |
| 26.296 | 15 | 84.226 |
| 26.296 | 16 | 84.933 |
| 26.296 | 17 | 84.933 |
| 26.296 | 18 | 85.450 |
| 26.296 | 19 | 85.813 |
| 26.296 | 20 | 86.053 |
| 26.296 | 21 | 86.236 |
| 26.296 | 22 | 86.405 |
| 26.296 | 23 | 86.527 |
| 26.296 | 24 | 86.635 |
| 26.296 | 25 | 86.704 |

TABLE I-continued

Relationship between correlation coefficient and quantization matrix order for a specific standard deviation.

| Standard Deviation | DCT Quantization Matrix Index | Correlation Coefficient |
|---|---|---|
| 26.296 | 26 | 86.767 |
| 26.296 | 27 | 86.811 |
| 26.296 | 28 | 86.841 |
| 26.296 | 29 | 86.862 |
| 26.296 | 30 | 86.879 |
| 26.296 | 31 | 86.889 |

In one aspect, for DCT quantization matrices, results of the calculation of correlation coefficients among a restored digital object and an associated original digital object can convey that a linear relationship is present between digital object variations and the DCT quantization matrix indices, wherein a digital object variation can be embodied in the standard deviation of a non-empty set of pixel values of an original digital object. In another aspect, a confidence level of about 95%, corresponding to a p-value of 0.05, can be utilized to reject the null hypothesis and determined that the exemplary results exhibit a linear relationship. In one embodiment, parameters of a linear equation indicative of the linear relationship between digital object variation and DCT quantization matrix index can be extracted through application of a linear regression to the exemplary results. In embodiment 200, for example, analysis component 232 can perform a regression (linear or non-linear) on a set of data and extract such parameters.

Figures 4, 5:
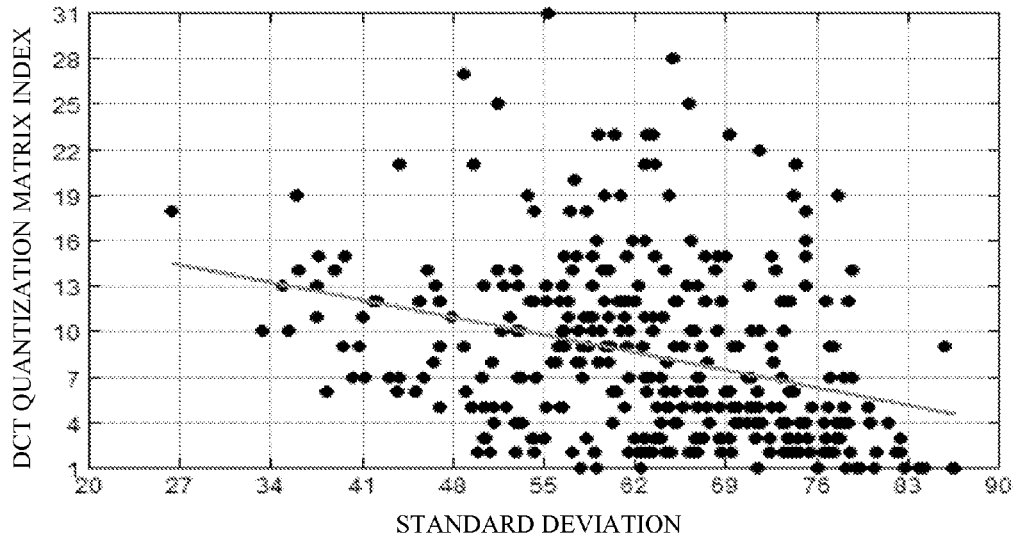
FIG. 4 illustrates an exemplary rendering of a quantization matrix index as a function of a digital variation metric in accordance with one or more aspects of the disclosure.
FIG. 5 illustrates results of the application of a linear regression to the exemplary data rendered in FIG. 4 in accordance with one or more aspects of the disclosure.

In another aspect, DCT quantization matrices retaining different frequency components can yield a specific correlation coefficient ($\chi$) between a restored digital object and an associated original digital object. In addition, original digital objects having different digital variation metrics can exhibit the specific correlation coefficient for a plurality of DCT quantization matrices. Accordingly, a plurality of (digital variation metric, DCT quantization matrix index) 2-tuples can be generated for the specific correlation coefficient. In one implementation in which the original digital objects are embodied in digital images and the digital variation metric is embodied in a standard deviation ($\sigma$) of pixel values of a digital image, an exemplary set of 762 standard deviation values can be generated for $\chi=0.85$. For such set, 341 values can be unique values which define a sample size (n). In addition, for each of the 341 standard deviation values, a DCT quantization matrix yielding a restored digital image exhibiting $\chi=0.85$ can be generated. Accordingly, a set of 341 2-tuples ($\sigma$, I) can be generated. FIG. 4 illustrates a rendering of the 341 2-tuples and a linear function 410 indicative of the relationship between DCT quantization matrix index and standard deviation. It can be appreciated that larger digital variations have associated smaller DCT quantization matrices indices. A linear regression applied to the 341 2-tuples yields the linear function (represented with a straight grey line in FIG. 4) which can be indicated as $I(\sigma)=b_1\sigma+b_0$, with slope $b_1=-0.1646$ and the ordinate-intercept (or Y intercept) $b_0=18.8391$. Results of the linear regression are illustrated in FIG. 5.

The linear function $I(\sigma)$ permits generating a look-up table for a DCT quantization matrix index for a specific standard variation $\sigma$. An exemplary look-up table for $\chi=0.85$ is illustrated in Table II.

TABLE II

Standard deviation and associated DCT quantization matrix index for a digital correlation coefficient $\chi = 0.85$.

| Standard Deviation | DCT Quantization Matrix Index |
|---|---|
| 1 | 19 |
| 2 | 19 |
| 3 | 18 |
| 4 | 18 |
| 5 | 18 |
| 6 | 18 |
| 7 | 18 |
| 8 | 18 |
| 9 | 17 |
| 10 | 17 |
| 11 | 17 |
| 12 | 17 |
| 13 | 17 |
| 14 | 17 |
| 15 | 16 |
| 16 | 16 |
| 17 | 16 |
| 18 | 16 |
| 19 | 16 |
| 20 | 16 |
| 21 | 15 |
| 22 | 15 |
| 23 | 15 |
| 24 | 15 |
| 25 | 15 |
| 26 | 15 |
| 27 | 14 |
| 28 | 14 |
| 29 | 14 |
| 30 | 14 |
| 31 | 14 |
| 32 | 14 |
| 33 | 13 |
| 34 | 13 |
| 35 | 13 |
| 36 | 13 |
| 37 | 13 |
| 38 | 13 |
| 39 | 12 |
| 40 | 12 |
| 41 | 12 |
| 42 | 12 |
| 43 | 12 |
| 44 | 12 |
| 45 | 11 |
| 46 | 11 |
| 47 | 11 |
| 48 | 11 |
| 49 | 11 |
| 50 | 11 |
| 51 | 10 |
| 52 | 10 |
| 53 | 10 |
| 54 | 10 |
| 55 | 10 |
| 56 | 10 |
| 57 | 9 |
| 58 | 9 |
| 59 | 9 |
| 60 | 9 |
| 61 | 9 |
| 62 | 9 |
| 63 | 8 |
| 64 | 8 |
| 65 | 8 |
| 66 | 8 |
| 67 | 8 |
| 68 | 8 |
| 69 | 7 |
| 70 | 7 |
| 71 | 7 |
| 72 | 7 |
| 73 | 7 |

TABLE II-continued

Standard deviation and associated DCT quantization matrix index for a digital correlation coefficient $\chi = 0.85$.

| Standard Deviation | DCT Quantization Matrix Index |
|---|---|
| 74 | 7 |
| 75 | 6 |
| 76 | 6 |
| 77 | 6 |
| 78 | 6 |
| 79 | 6 |
| 80 | 6 |
| 81 | 6 |
| 82 | 5 |
| 83 | 5 |
| 84 | 5 |
| 85 | 5 |
| 86 | 5 |
| 87 | 5 |
| 88 | 4 |
| 89 | 4 |
| 90 | 4 |
| 91 | 4 |
| 92 | 4 |
| 93 | 4 |
| 94 | 3 |
| 95 | 3 |
| 96 | 3 |
| 97 | 3 |
| 98 | 3 |
| 99 | 3 |

Generally, for a digital correlation coefficient $\chi$, a function $I^{(\chi)}(\sigma)$ relating to a quantization matrix index I and a standard deviation $\sigma$ can be obtained, for example, from a regression (either linear or non-linear) applied to a plurality of $Q(\sigma, I)$ tuples. Table III illustrates exemplary parameters (y-intercept and slope) that define a linear function $I^{(\chi)}(\sigma)$ for 11 values of $\chi$ ranging from 80 to 90. The illustrated linear functions can be obtained via application of a linear regression to a plurality of $(\sigma, I^{(\chi)})$ tuples for each value of $\chi$ shown at Table III. Regression coefficients indicative of suitability of a linear relationship between I and also are presented, conveying that for larger values of $\chi$, a linear relationship is a better fit for a plurality of $(\sigma, I^{(\chi)})$ tuples.

TABLE III

Exemplary parameters defining a linear function $I^{(\chi)}(\sigma)$ for different values of digital correlation coefficient $\chi$.

| Correlation Coefficient | Regression Coefficient | Y-intercept | Slope |
|---|---|---|---|
| 80 | −0.1781718 | 13.20224 | −0.09084 |
| 81 | −0.2119922 | 14.27443 | −0.10686 |
| 82 | −0.140358 | 13.09206 | −0.07700 |
| 83 | −0.2544053 | 16.17496 | −0.13041 |
| 84 | −0.2986262 | 17.85488 | −0.15179 |
| 85 | −0.3152117 | 18.83910 | −0.16455 |
| 86 | −0.3617154 | 20.11851 | −0.17832 |
| 87 | −0.3485397 | 20.28529 | −0.17627 |
| 88 | −0.3856367 | 22.77088 | −0.20346 |
| 89 | −0.4111239 | 23.86839 | −0.21432 |
| 90 | −0.4168778 | 75.56278 | −0.81879 |

It should be appreciated that exemplary compression techniques 100 and 500 can be applied to in motion video compression, in which such technique can be utilized to compress one or more types of frames, such as I-frames and/or residual frames, including P frames and B frames.

Figure 6A:
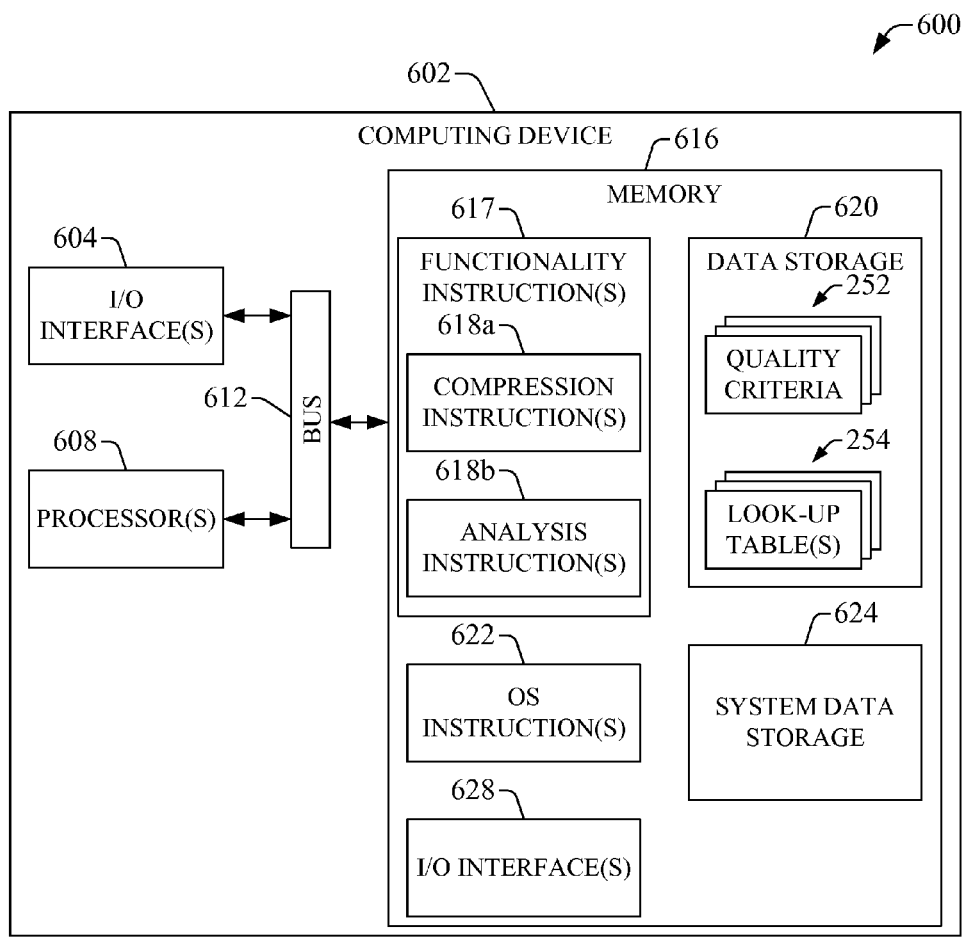
FIGS. 6A-6B illustrates an exemplary computing device in accordance with one or more aspects of the disclosure.
Figure 6B:
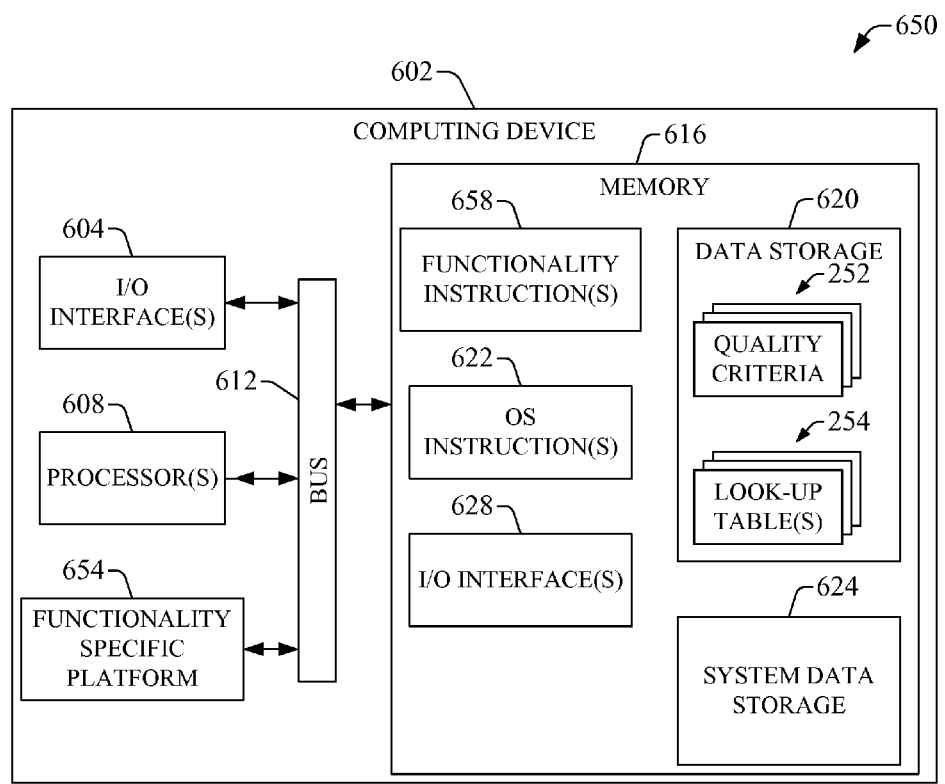

FIGS. 6A-6B are high-level block diagrams of exemplary embodiments of a computing device 600 in accordance with one or more aspects of the disclosure. The computing device 602 can embody or can comprise one or more of the quality assurance unit 230 or the compression engine 210. In the illustrated embodiments, the computing device 602 comprises a group of one or more I/O interfaces 604, a group of one or more processors 608, a memory 616, and a bus 612 that functionally couples (e.g., communicatively couples) two or more of the functional elements of the computing device 602, including the group of one or more processors 608 to the memory 616. In scenarios in which operation of computing device 602 can be critical to network performance, the group of one or more processors 608 can comprise a plurality of processors that can exploit concurrent computing.

Functionality of the computing device 602 can be configured by a group of computer-executable instructions (e.g., programming code instructions or programming modules) that can be executed by at least one processor of the one or more processors 608. Generally, programming modules can comprise computer code, routines, objects, components, data structures (e.g., metadata objects, data object, control objects), and so forth, that can be configured (e.g., coded or programmed) to perform a particular action or implement particular abstract data types in response to execution by the at least one processor. For example, a first group of computer-executable instructions can configure logic that, in response to execution by the at least one processor, can enable the computing device 602 to operate as a compression engine or quality assurance unit, or both.

Data and computer-accessible instructions, e.g., computer-readable instructions and computer-executable instructions, associated with specific functionality of the computing device 602 can be retained in memory 616. For instance, in the illustrated embodiment, memory elements 618a and 618b comprise compression instruction(s) and analysis instruction(s), respectively, and data storage 620 comprises quality criteria 252 and look-up table(s) 254. Such data and instructions can permit implementation, at least in part, of the compression technique that can permit determining dynamically a satisfactory quantization matrix in accordance with one or more aspects of the disclosure. In one aspect, the computer-accessible instructions can embody any number of programming code instructions or program modules that permit specific functionality. In the subject specification and annexed drawings, memory elements are illustrated as discrete blocks; however, such memory elements and related computer-accessible instructions (e.g., computer-readable and computer-executable instructions), and data can reside at various times in different storage elements (registers, memory pages, files, databases, memory addresses, buffers, etc.; not shown) in memory 616.

As described herein, data storage 620 can comprise a variety of data, metadata, or both, associated with compression of a digital object and related dynamic generation of a quantization matrix in accordance with aspects described herein. As another illustration, in a configuration in which the computing device 602 can embody the quality assurance unit 230, the data storage 620 comprise information associated with intended quality of compression (e.g., quality criteria 252) and available resources (e.g., look-up table(s) 254) available for dynamic generation of a quantization matrix in accordance with one or more aspects of the disclosure.

Memory 616 also can comprise one or more computer-executable instruction(s) for implementation of specific functionality of the computing device 602 in connection with the dynamic determination of a quantization matrix associated with a space-domain-to-frequency-domain transform in a compression scheme in accordance with one or more aspects of the disclosure. Such computer-executable instructions can be retained as one or more memory elements. For example, in the illustrated embodiment, the memory 616 comprises a memory element labeled functionality instruction(s) 617, which can comprise memory elements labeled compression instruction(s) 618a and analysis instruction(s) 618b. In additional or alternative embodiments, the computing device 602 can comprise one of memory elements 618a or 618b depending, for example, on whether computing device 602 embodies or comprises the compression engine 210 or the quality assurance unit 230. In one aspect, as described herein, compression instruction(s) 618a and analysis instructions(s) 618b can be stored as an implementation (e.g., a compiled instance) of one or more computer-executable instructions that implement and thus provide at least the functionality of the methods described herein (e.g., exemplary methods 700-900 presented in FIGS. 7-9). Compression instruction(s) 618a and analysis instructions(s) 618b also can be transmitted across some form of computer readable media.

It should be appreciated that different functionality instruction(s) can render physically alike computing devices, such as computing device 602, into functionally different components (e.g., a compression engine or a quality assurance unit), with functional differences dictated by logic (e.g., computer-executable instructions and data) specific to each one of such computing devices and defined by the functionality instruction(s) 617. In an exemplary configuration in which the computing device 602 embodies the compression engine 210, the functionality instruction(s) 617 can include compression instruction(s) 618a without including the analysis instruction(s) 618b. In one aspect, the compression instruction(s) 618a can embody computer-accessible instructions that, in response to execution by a processor (e.g., a processor of the one or more processors 608), can permit the computing device 602 to compress a digital object (e.g., a digital image) in accordance with one or more aspects described herein. In another exemplary configuration in which the computing device 602 embodies the quality assurance unit 230, the functionality instruction(s) 618 can include analysis instruction(s) 618b without including the compression instruction(s) 618a. In one aspect, the analysis instruction(s) 618a can embody computer-accessible instructions that, in response to execution by a processor, can permit the computing device 602 to determine (e.g., generate, generate and transmit) dynamically a quantization matrix associated with a space-domain-to-frequency-domain transform (DCT transform, wavelet transform, or the like) and/or generate a functional relationship (such as a linear relationship) among a digital variation metric of a digital object to be compressed and a parameter indicative of a quantization matrix associated with the space-domain-to-frequency-domain transform.

Memory 616 can be embodied in a variety of computer-readable media. Exemplary computer-readable media can be any available media that is accessible by a processor in a computing device, such as one processor of the group of one or more processors 608, and comprises, for example, both volatile and non-volatile media, removable and non-removable media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be utilized to store the desired information and which can be accessed by a computer or a processor therein or functionally coupled thereto.

The memory 616 can comprise computer-readable non-transitory storage media in the form of volatile memory, such as random access memory (RAM), electrically erasable programmable read-only memory (EEPROM), and the like, or non-volatile memory such as read only memory (ROM). In one aspect, memory 616 can be partitioned into a system memory that can contain data and/or programming modules that enable essential operation and control of the computing device 602. Such program modules can be implemented (e.g., compiled and stored) in memory element 622, referred to as operating system (OS) instruction(s) 622, and/or a portion of memory element 628, referred to as I/O interface(s) 628. The data contained in the system memory can be system data that is retained in memory element 624, referred to as system data storage 624. The OS instruction(s) 622, the portion of the I/O interface(s) 628, and system data storage 624 can be immediately accessible to and/or are presently operated on by at least one processor of the group of one or more processors 608. The OS instruction(s) 622 can embody an operating system for the computing device. Specific implementation of such OS can depend in part on architectural complexity of the computing device 602. Higher complexity affords higher-level OSs. Example operating systems can include Unix, Linux, iOS, Windows operating system, and substantially any operating system for a computing device. In certain scenarios, the operating system embodied in OS instruction(s) 622 can have different levels of complexity based on particular configuration of the computing device 602.

Memory 616 can comprise other removable/non-removable, volatile/non-volatile computer-readable non-transitory storage media. As an example, memory 616 can include a mass storage unit (not shown) which can provide non-volatile storage of computer code, computer readable instructions, data structures, program modules, and other data for the computing device 602. A specific implementation of such mass storage unit (not shown) can depend on desired form factor of the computing device 602 and space available for deployment thereof. For suitable form factors and sizes of the computing device 602, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), or the like.

In certain embodiments, as illustrated in embodiment 650, the computing device 602 can comprise a functionality specific platform 654 that can include one or more components the permit functionality of the computing device 602. In one aspect, a component of the one or more components can be a firmware component which can have dedicated resources (e.g., a processor, software, etc.) to implement certain functions that support implementation of or implement at least part of the functionality of the computing device 602 in accordance with one or more aspects of the disclosure. In another aspect, the functionality specific platform 654 can include at least a portion of the one or more processors 608 which can be dedicated to execution of a part or all of computer-accessible instructions contained in memory 616, in the block labeled as functionality instruction(s) 658, thus relieving at least some of the computational load from the one or more processors 608 for other operation of the computing device 602. In certain implementations, the computer-accessible instructions can comprise a portion of the computer-accessible instructions in compression instruction(s) 618a and/or analysis instruction(s) 618b. In one exemplary configuration in which the computing device 602 is configured to carry out compression of digital objects according to one or more aspects of the disclosure, the functionality specific platform 654 can be embodied in or can comprise the compression engine 210 and functional element therein. In another exemplary configuration in which the computing device 602 is configured to analyze data obtained from compression of digital objects and/or to generate a quantization matrix dynamically based at least on features of a compressed digital object and a desired quality of compression, the functionality specific platform 610 can be embodied in or can comprise the quality assurance unit 230.

As described herein, features of compression of a digital object and related dynamic generation of a quantization matrix in accordance with one or more aspects of the disclosure, can be performed, at least in part, in response to execution of software components by a processor. The software components can include one or more implementations (e.g., encoding) of functionality instruction(s) 617, including compression instruction(s) 618a and/or analysis instruction(s) 618b.

In general, a processor of the group of one or more processors 608 can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or more processors 608 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage (e.g., improve form factor) or enhance performance of the computing devices that can implement the various aspects of the disclosure. In another aspect, the one or more processors 608 can be implemented as a combination of computing processing units.

The one or more input/output (I/O) interfaces 604 can functionally couple (e.g., communicatively couple) computing device 602 to another functional element (component, unit, server, gateway node, repository, etc.) of system(s) or device(s) that can perform compression of digital objects, for example. Functionality of the computing device 602 that is associated with data I/O or signaling I/O can be accomplished in response to execution, by a processor of the group of one or more processors 608, of at least one I/O interface retained in memory element 628. Such memory element is represented by the block I/O interface(s) 628. In some embodiments, the at least one I/O interface embodies an API that permit exchange of data or signaling, or both, via an I/O interface of I/O interface(s) 604. In certain embodiments, the one or more I/O interfaces 604 can include at least one port that can permit connection of the computing device 602 to other functional elements of the exemplary network environment 100. In one or more scenarios, the at least one port can comprise network adaptor(s) such as those present in reference links, and other computing devices. In other scenarios, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like. The at least one I/O interface of the one or more I/O interfaces 604 can enable delivery of output (e.g., output data, output signaling) to such functional elements. Such output can represent an outcome or a specific action of one or more actions described herein, such as in the methods of FIGS. 7-9.

Bus 612, and the various configurations thereof, such as bus 612 and bus 712, represents one or more of several types of bus structures, including a memory bus or memory controller, a peripheral bus, an accelerated graphics port, and a processor or local bus using any of a variety of bus architectures. As an example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB), and the like.

In exemplary embodiments 600 and 650, the computer-executable instructions stored in memory 616 can configure a processor of the processor(s) 608 to carry out various functions. In one aspect, the processor can be configured to determine an image variation metric of a digital image and to provide, based at least on the image variation metric, a space-domain-to-frequency-domain transform quantization matrix for compression of the digital image. In another aspect, the processor can be further configured, by the computer-executable instructions, to compute an image variation metric comprising one or more of a skewness of values of a plurality of pixels contained in the digital image or a standard deviation of said values. In yet another aspect, the processor can be further configured, by the computer-executable instructions, to compute an image variation metric comprising a standard deviation of values of a plurality of pixels contained in the digital image.

In still another aspect, the processor can be further configured, by the computer-executable instructions, to determine a two-dimensional (2D) discrete cosine transform (DCT) quantization matrix. In one implementation, to determine such quantization matrix, the processor can be further configured, by the computer-executable instructions, to compute a value of a predetermined linear function of the image variation metric, the value being indicative of the number of frequency coefficients retained in the 2D DCT quantization matrix, and wherein the predetermined linear function depends at least on a specific degree of correlation between an original digital image and a restored image obtained from restoring a compressed instance of the original digital image. The degree of correlation can determined by a Pearson product-moment correlation coefficient computed in accordance with one or more aspects described herein. In addition or in the alternative, the processor can be further configured, by the computer-executable instructions, to select the 2D DCT quantization matrix from a lookup table having the image variation metric and a correlation metric indicative of the specific degree of correlation as primary key, and wherein the lookup table comprises at least one value of a predetermined linear function of the image variation metric, the value being indicative of a number of frequencies retained in the 2D DCT quantization matrix. In yet other implementations, the processor can be further configured, by the computer-executable instructions, to acquire a specific correlation metric prior to determining the image variation metric of the digital image.

In embodiments in which the computing device 602 comprises analysis instruction(s) 618b, the computing device 602, can carry out analysis of compression information associated with compression of a plurality of digital objects in response to execution of the analysis instruction(s) 618b by a processor of the processor(s) 608. Such analysis can permit generating a functional relationship between an original digital object and a restored instance of such object obtained after compression of the original digital object. In one aspect, implementing the analysis can include implementing the exemplary method 900 presented in FIG. 9 and described herein. In addition or in the alternative, in embodiments in which the computing device 602 comprises the quality assurance unit 230 as part of the functionality specific platform 654, operation of such platform can implement the analysis of compression information associated with compression of a plurality of digital objects in accordance with the various aspects described herein.

Figure 7:
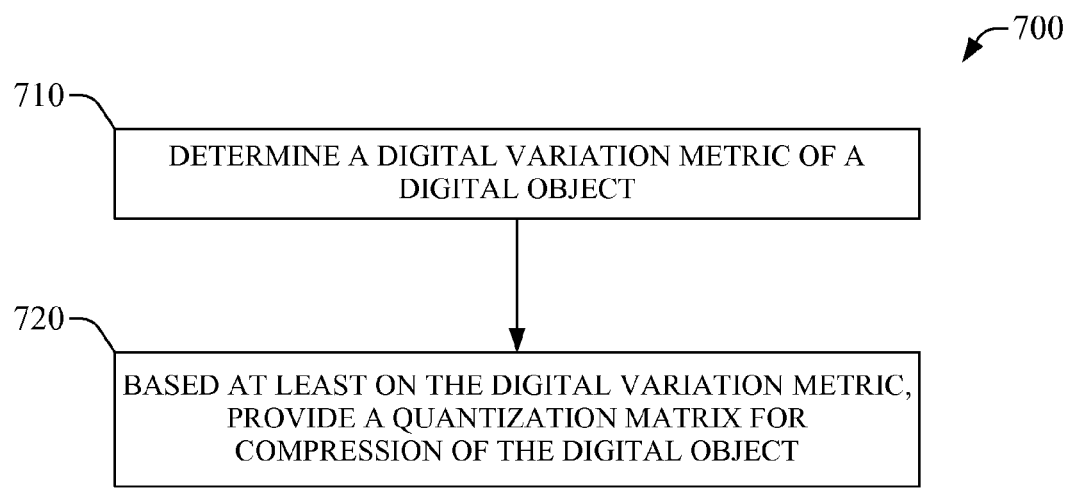
FIGS. 7-9 illustrate exemplary methods in accordance with one or more aspects of the disclosure.
Figure 8:
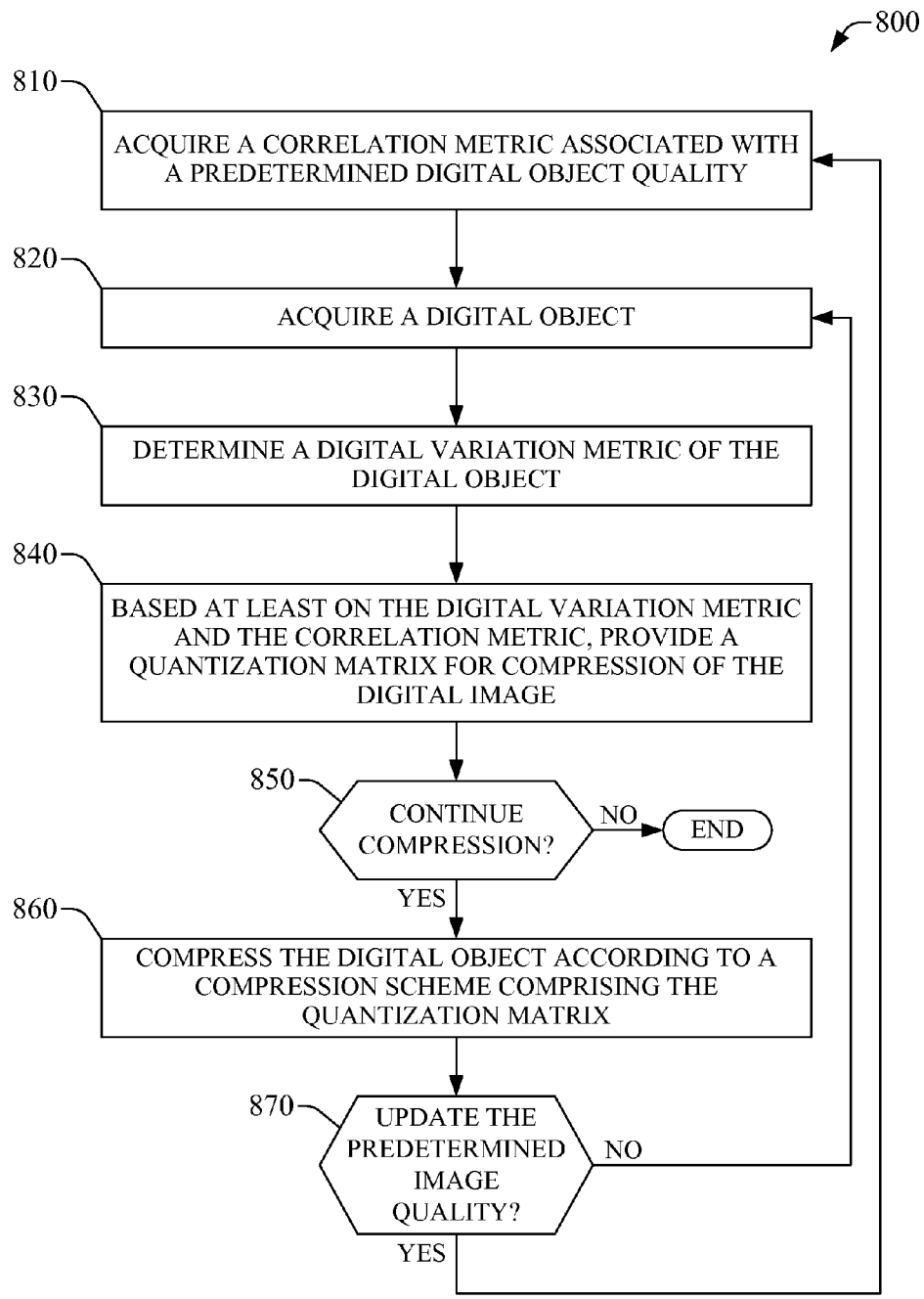
Figure 9:
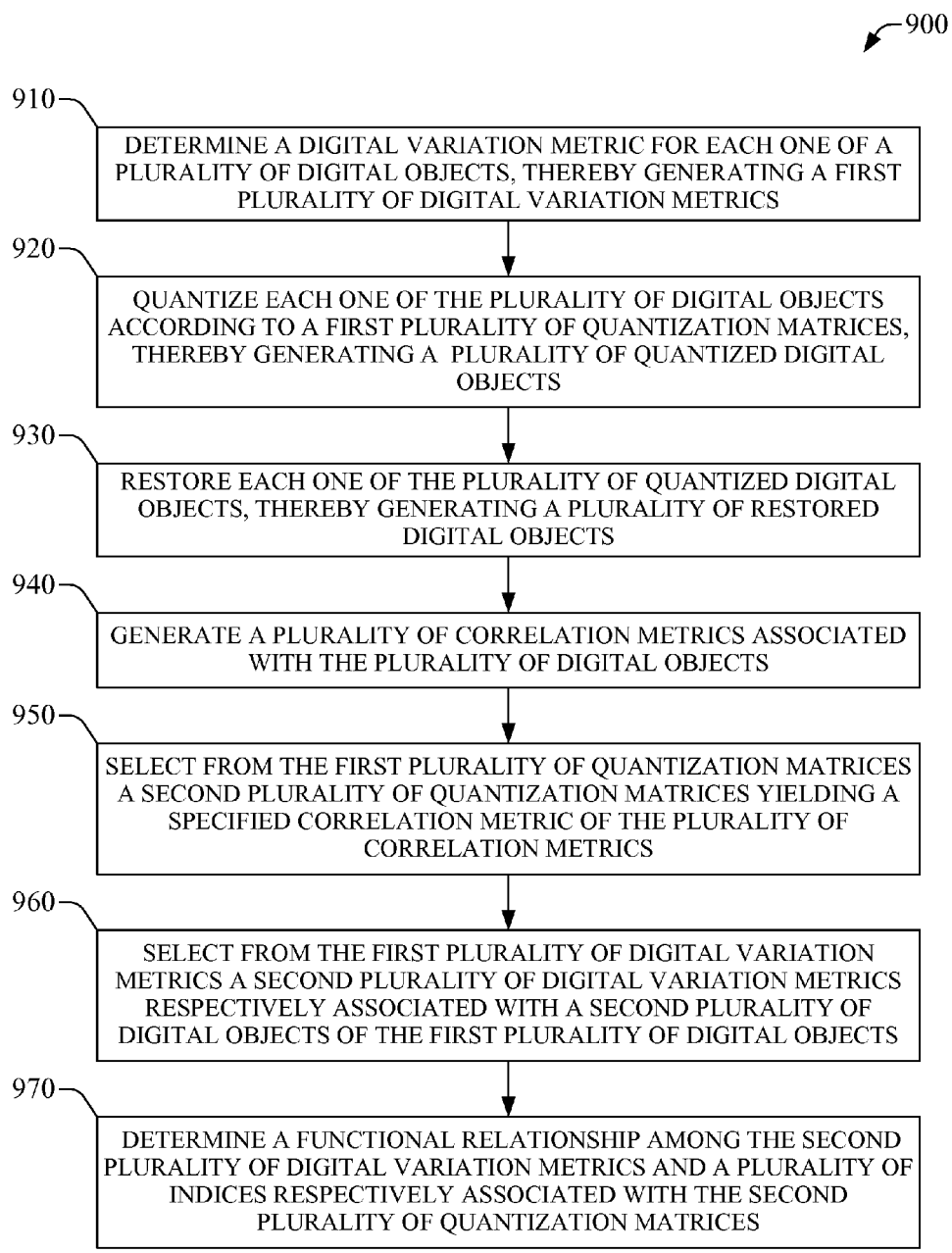

In view of the various aspects of compression of digital objects, such as those described herein, exemplary methods that can be implemented in accordance with the disclosure can be better appreciated with reference to the exemplary flowcharts in FIGS. 7-9. For simplicity of explanation, the exemplary methods disclosed herein are presented and described as a series of actions (also referred to as steps), pictorially represented with a block. However, it is to be understood and appreciated that implementation, and related advantages, of such methods is not limited by the order of actions, as some actions may occur in different orders and/or concurrently with other actions from that shown and described herein. For example, the various methods (also referred to as processes) of the disclosure can be alternatively represented as a series of interrelated states or events, such as in a state diagram. Moreover, when disparate functional elements (network nodes, units, etc.) implement different portions of the methods of the disclosure, an interaction diagram or a call flow can represent such methods or processes. Furthermore, not all illustrated actions may be required to implement a method in accordance with the subject disclosure.

The methods disclosed throughout the subject specification and annexed drawings can be stored on an article of manufacture, or computer-readable storage medium, to facilitate transporting and transferring such methods to computing devices (e.g., desktop computers, mobile computers, mobile telephones, and the like) for execution, and thus implementation, by a processor or for storage in a memory.

FIG. 7 presents a flowchart of an exemplary method 700 for selecting a quantization mask suitable for compression of a digital content in accordance with one or more aspects of the disclosure. In one aspect, one or more blocks of the subject example method 700 can be implemented (e.g., executed) by a computing device (e.g., computing device 602) or a processor integrated with or functionally coupled to such device. In certain implementations, the computing device can embody one or more of the compression engine 210 or the quality assurance unit 230 or component(s) therein (e.g., quantization component 216, analysis component 232, mask constructor 232, a combination thereof, or the like). At block 710 a digital variation metric of a digital object can be determined. Block 710 is referred to as a determining action and, in one aspect, can comprise computing a digital variation metric. As described herein, the digital variation metric can be at least one of a skewness of values of a plurality of pixels contained in the digital object or a standard deviation of such values. At block 720, a quantization matrix for compression of the digital object can be provided based at least on the digital variation metric. The quantization matrix can be associated with a space-domain-to-frequency-domain transform, such as a DCT. Block 720 is referred to as a providing action. In one aspect, the providing action can comprise determining a 2D DCT quantization matrix. As described herein, in certain embodiments, determining the 2D DCT can comprise computing a value of a predetermined linear function of the digital variation metric. The value can be indicative of the number of frequency coefficients (or frequency components) retained in the 2D DCT quantization matrix. The predetermined linear function can depend, for example, at least on a specific degree of correlation between an original digital object and a restored digital object (e.g., a restored image) obtained from restoring a compressed instance of the original digital object (e.g., a compressed image). In one alternative or additional embodiment, the exemplary method 700 can comprise acquiring the specific degree of correlation prior to the determining action.

In other embodiments, determining the 2D DCT quantization matrix can comprise selecting the 2D DCT quantization matrix from a lookup table having the digital variation metric and the specific degree of correlation as primary key. The lookup table can comprise at least one value of a predetermined linear function of the digital variation metric, the value being indicative of a number of frequency components retained in the 2D DCT quantization matrix.

FIG. 8 presents a flowchart of an exemplary method 800 for dynamically selecting a quantization matrix suitable for compression of a digital content at a predetermined quality in accordance with one or more aspects of the disclosure. In one aspect, one or more blocks of the subject example method 800 can be implemented (e.g., executed) by a computing device (e.g., computing device 602) or a processor integrated with or functionally coupled to such device. In certain implementations, the computing device can embody one or more of the compression engine 210 or the quality assurance unit 230 or component(s) therein (e.g., quantization component 216, analysis component 232, mask constructor 232, a combination thereof, or the like). At block 810, a correlation metric associated with a predetermined digital object quality is acquired (e.g., accessed or received). In one aspect, the correlation metric is indicative of an intended or desired degree of correlation among an original digital object and a restored digital object obtained by restoring a compressed instance of the original digital object. At block 820 a digital object is acquired. At block 830, a digital variation metric of a digital object is determined. As described herein, the digital variation metric can be at least one of a skewness of values of a plurality of pixels contained in the digital object or a standard deviation of such values. At block 840, a quantization matrix for compression of the digital object is provided based at least on the digital variation metric and the correlation metric. The quantization matrix can be associated with a space-domain-to-frequency-domain transform, such as a DCT. Aspects of implementation of block 840 can be substantially the same as aspects of implementation of block 720 as described herein. It should be appreciated that the quantization matrix that can be provided is specific to the predetermined digital object quality.

At block 850 it is determined if compression of digital objects is to be continued. In the negative case, flow of the exemplary method 800 terminates. In the alternative, flow is directed to block 860, in which the digital object is compressed according to a compression scheme comprising the quantization matrix. At block 870, it is determined if the predetermined digital object quality is to be updated. In the affirmative case, flow is directed to block 810. Alternatively, flow is directed to block 820, in which another digital object can be acquired.

As described herein, the quantization matrices provided in blocks 720 and 840 include evaluation of a predetermined linear function. In other embodiments, providing such quantization matrices can comprise evaluating a functional relationship, other than a linear relationship, among a digital variation metric of an object to be compressed and a parameter (e.g., a real number) indicative of a quantization matrix. The functional relationship can be specific to a desired quality of a digital object restored after compression of an original digital object (e.g., a raw image).

FIG. 9 presents a flowchart of an exemplary method 900 for generating the foregoing functional relationship. In one aspect, one or more blocks of the subject example method 900 can be implemented (e.g., executed) by a computing device (e.g., computing device 602) or a processor integrated with or functionally coupled to such device. In certain implementations, the computing device can embody the quality assurance unit 230 or component(s) therein (e.g., analysis component 232 or mask constructor 232, or a combination thereof). At block 910, a digital variation metric for each one of a plurality of digital objects (e.g., digital images, digital audio segments, a combination thereof, or the like) is determined, thereby generating a first plurality of digital variation metrics. In one aspect, determining such digital variation metric can comprise computing one or more of a standard deviation of values of a plurality of pixels contained in each one of the first plurality of digital objects, or a skewness of such values. At block 920, each one of the plurality of digital objects is quantized according to a first plurality of quantization matrices, thereby generating a plurality of quantized digital objects. In one aspect, the plurality of quantized digital objects can be respectively associated with the plurality of digital objects. Each quantization matrix of the first plurality of quantization matrices is specific to a space-domain-to-frequency-domain transform utilized in a compression scheme comprising the quantization of each one of the plurality of digital objects. At block 930, each one of the plurality of quantized digital objects is restored, thereby generating a plurality of restored digital objects. In one aspect, the plurality of restored digital objects can be respectively associated with the plurality of digital objects. In one aspect, restoring a quantized digital object can be implemented in accordance with aspects described herein in connection with FIG. 1, for example. At block 940, a plurality of correlation metrics associated with the plurality of digital objects is generated. Each correlation metric of the plurality of correlation metrics can indicate a measure of the statistical relationship among a first group of pixel values representative of each digital object of the plurality of digital objects and a second group of pixel values representative of a respective restored digital object. At block 950, a second plurality of quantization matrices is selected from the first plurality of quantization matrices, the second plurality of quantization matrices yielding a specified correlation metric of the plurality of correlation metrics. At block 960, a second plurality of digital variation metrics is selected from the first plurality of digital variation metrics, the second plurality of digital variation metrics being respectively associated with a second plurality of digital objects of the first plurality of digital objects. In one aspect, each one of the second plurality of digital images can exhibit the specified correlation metric in response to quantization according to each of the second plurality of quantization matrices. At block 970, a functional relationship among the second plurality of digital variation metrics and a plurality of indices respectively associated with the second plurality of quantization matrices is determined. The functional relationship can be determined in accordance with one or more aspects described herein. In one aspect, each one of the plurality of indices can convey a number of frequencies retained in a respective quantization matrix.

When compared with conventional technologies for compression of digital objects, various advantages of the disclosure over such technologies emerge from the subject specification. For example, the disclosure can provide, dynamically, a quantization matrix suitable to achieve a specific compression quality for compression of a digital object.

One or more embodiments of the subject disclosure can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the systems, apparatuses, and methods have been described in connection with exemplary embodiments and specific examples, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where a description of a protocol, procedure, process, or method does not actually recite an order to be followed by its acts or steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent that various modifications and variations can be made without departing from the scope or spirit of the subject disclosure. Other embodiments will be apparent from consideration of the specification and practice disclosed herein. It is intended that the specification and examples be considered as non-limiting illustrations only, with a true scope and spirit of the subject disclosure being indicated by the following claims.

What is claimed is:

1. A method, comprising:
   determining, at a computing device, an image variation metric of a digital image; and
   providing, by the computing device, based at least on the image variation metric, a space-domain-to-frequency-domain transform quantization matrix for compression of the digital image.

2. The method of claim 1, wherein determining the image variation metric of the digital image comprises computing a skewness of values of a plurality of pixels contained in the digital image.

3. The method of claim 1, wherein determining the image variation metric of the digital image comprises computing a standard deviation of values of a plurality of pixels contained in the digital image.

4. The method of claim 1, wherein providing the space-domain-to-frequency-domain transform quantization matrix for compression of the digital image comprises determining a two-dimensional (2D) discrete cosine transform (DCT) quantization matrix.

5. The method of claim 4, wherein determining the 2D DCT quantization matrix comprises computing a value of a predetermined linear function of the image variation metric, the value being indicative of a number of frequency coefficients retained in the 2D DCT quantization matrix, and wherein the predetermined linear function depends at least on a specific correlation metric between an original digital image and a restored image obtained from restoring a compressed instance of the original digital image.

6. The method of claim 4, wherein determining the 2D DCT quantization matrix comprises selecting the 2D DCT quantization matrix from a lookup table having the image variation metric and a specific correlation metric as a primary key, and wherein the lookup table comprises at least one value of a predetermined linear function of the image variation metric, the at least one value being indicative of a number of frequencies retained in the 2D DCT quantization matrix.

7. The method of claim 4, further comprising acquiring a specific correlation metric prior to determining the image variation metric of the digital image.

8. The method of claim 7, wherein acquiring the specific correlation metric prior to determining the image variation metric of the digital image comprises acquiring data indicative of a Pearson product-moment correlation coefficient.

9. A method, comprising:
determining an image variation metric for each one of a first plurality of digital images, thereby yielding a first plurality of image variation metrics;
quantizing each one of the first plurality of digital images according to a first plurality of quantization matrices for image compression, thereby yielding a plurality of quantized images respectively associated with the first plurality of digital images;
restoring each one of the plurality of quantized images, thereby yielding a plurality of restored images respectively associated with the first plurality of digital images;
determining a correlation coefficient among a digital image of the first plurality of digital images and a respective restored image of the plurality of restored images for each one of the first plurality of digital images;
selecting from the first plurality of quantization matrices for image compression a second plurality of quantization matrices yielding a specified correlation coefficient;
selecting from the first plurality of image variation metrics a second plurality of image variation metrics respectively associated with a second plurality of digital images of the first plurality of digital images, each one of the second plurality of digital images exhibiting the specified correlation coefficient in response to quantization according to each of the second plurality of quantization matrices; and
determining a functional relationship among the second plurality of image variation metrics and a plurality of indices respectively associated with the second plurality of quantization matrices, each one of the plurality of indices conveying a number of frequencies retained in a respective quantization matrix.

10. The method of claim 9, wherein determining the functional relationship comprises computing a linear regression among the second plurality of image variation metrics and the plurality of indices respectively associated with the second plurality of quantization matrices.

11. The method of claim 9, further comprising generating a lookup table relating an image variation metric of the second plurality of image variation metrics to a value of the functional relationship, the value of the functional relationship indicative of an index of the plurality of indices.

12. The method of claim 9, wherein determining the image variation metric for each one of the first plurality of digital images comprises computing, for each one of the first plurality of digital images, a standard deviation of values of a plurality of pixels contained in the respective one of the first plurality of digital images.

13. A device, comprising:
a memory having data and computer-executable instructions stored thereon; and
a processor functionally coupled to the memory and configured, by the computer-executable instructions,
to determine an image variation metric of a digital image; and
to provide, based at least on the image variation metric, a space-domain-to-frequency-domain transform quantization matrix for compression of the digital image.

14. The device of claim 13, wherein the processor is further configured, by the computer-executable instructions, to compute the image variation metric based on a skewness of values of a plurality of pixels contained in the digital image.

15. The device of claim 13, wherein the processor is further configured, by the computer-executable instructions, to compute the image variation metric based on a standard deviation of values of a plurality of pixels contained in the digital image.

16. The device of claim 13, wherein the processor is further configured, by the computer-executable instructions, to determine a two-dimensional (2D) discrete cosine transform (DCT) quantization matrix.

17. The device of claim 16, wherein the processor is further configured, by the computer-executable instructions, to compute a value of a predetermined linear function of the image variation metric, the value being indicative of a number of frequency coefficients retained in the 2D DCT quantization matrix, and wherein the predetermined linear function depends at least on a specific degree of correlation between an original digital image and a restored image obtained from restoring a compressed instance of the original digital image.

18. The device of claim 17, wherein the specific degree of correlation is determined based on a Pearson product-moment correlation coefficient.

19. The device of claim 16, wherein the processor is further configured, by the computer-executable instructions, to select the 2D DCT quantization matrix from a lookup table having the image variation metric and a correlation metric indicative of a specific degree of correlation as a primary key, and wherein the lookup table comprises at least one value of a predetermined linear function of the image variation metric, the at least one value being indicative of a number of frequencies retained in the 2D DCT quantization matrix.

20. The device of claim 16, wherein the processor is further configured, by the computer-executable instructions, to acquire a specific correlation metric prior to determining the image variation metric of the digital image.

* * * * *